United States Patent [19]

Beasley

[11] Patent Number: 5,097,452
[45] Date of Patent: Mar. 17, 1992

[54] ANALYSIS OF MIGRATION VELOCITY BY MIGRATION OF VELOCITY SPECTRA

[75] Inventor: Craig J. Beasley, Hillcrest Arcadia, Singapore

[73] Assignee: Western Atlas International, Inc., Houston, Tex.

[21] Appl. No.: 703,463

[22] Filed: May 21, 1991

[51] Int. Cl.⁵ .............................................. G01V 1/36
[52] U.S. Cl. .......................................... 367/53; 367/50
[58] Field of Search ....................... 367/50, 51, 52, 53; 364/421

[56] References Cited

U.S. PATENT DOCUMENTS

| | | | |
|---|---|---|---|
| 4,479,205 | 10/1984 | Gray | 367/63 |
| 4,742,497 | 5/1988 | Beasley | 367/52 |
| 4,797,861 | 1/1989 | Beasley | 367/50 |
| 4,943,950 | 7/1990 | Beasley | 367/50 |

*Primary Examiner*—Ian J. Lobo
*Attorney, Agent, or Firm*—William A. Knox

[57] ABSTRACT

Velocity spectra are computed from unmigrated CMP gathers after correction for dip moveout. The velocity spectra are then migrated to their true spatial position. The migrated velocity spectra are then used to calculate a migrated dip section.

2 Claims, 2 Drawing Sheets

ANALYSIS OF MIGRATION VELOCITY BY MIGRATION OF VELOCITY SPECTRA

BACKGROUND OF THE INVENTION

1. Field of the Invention

This invention generally relates to a seismic data processing and in particular to a computationally efficient method for migrating the DMO stacking-velocity field, which is initially located at an unmigrated position, to its proper spatial location.

2. Discussion of the Prior Art

In the process of seismic exploration, arrays of receivers are emplaced along a grid consisting of multiple lines of profile in an area to be surveyed. An energy source insonifies the arrays by generating a wavefield that is reflected from sub-surface earth layers, to be detected by the receivers on the surface of the earth. The data signals from the respective receivers are combined or stacked in Common Mid Point (CMP) gathers. The geophysicist processes those gathers to image the depths and structural pattern of the sub-surface earth layers. The computer-processed data are displayed on suitable multi-trace cross sections or profiles analogous to geologic cross sections of the earth. There may be hundreds of thousands of individual data points originating from a given survey. For efficient computer utilization, the data must be compressed to a reasonable volume of data. The CMP stacking process is a common compression method.

The various methods for CMP stacking and dip migration are well known. For example see U.S. Pat. Nos. 4,742,497 and 4,943,950, assigned to the assignee of this invention and which are incorporated herein by reference; also see chapters 3 and 4 of "Seismic Data Processing" by Özdogan Yilmaz, published by the Society of Exploration Geophysicists.

Unprocessed seismic reflection signals from a given earth layer, mapped as a function of travel time vs. offset distance from the source, form hyperbolae. A diffraction pattern from a point source in the earth such as a fault scarp also is hyperbolic. Prior to stacking, the hyperbolic envelopes of the reflected signals are rectified by application of correction-time differences that are computed from the stacking velocity. The stacking velocity may be constant or variable as a function of depth, depending on the geology of the region. The correction-time difference between the original reflection-time hyperbolic envelope and the rectified reflection time, for any given trace, is termed Normal Moveout (NMO). NMO is calculated from a stacking velocity appropriate to the two-way travel time to the reflection in question. By the same process, the diffractions are collapsed to their apices.

If a given earth layer has a slope or dip, the apparent stacking velocity increases with increasing dip angle. The calculated normal moveout derived from the apparent stacking velocity must therefore be compensated for dip as outlined in the '497 patent, by applying DMO (dip moveout).

The DMO stacking velocity originates from the unmigrated position of a given reflector beneath a selected CMP location. But a reflection from a dipping reflector, as perceived at a particular CMP location, does not lie directly beneath that location; it must be migrated up-dip laterally and to a shallower position in the cross section, to image properly the sub surface. Customarily, the observed DMO velocity was used for data migration after stack. But the DMO velocity is located at the unmigrated reflector position. For use as a migration velocity the DMO velocity itself should be migrated or repositioned prior to use in dip migration after stacking.

Steeply-dipping shallow events may interfere with flat-lying deeper events. Accordingly, the unmigrated DMO velocity determined for a particular event, in the presence of interfering or crossing events, will be multi-valued. Because of that problem, the resulting velocity spectrum will lack resolution.

This invention provides a computationally efficient method that uses conventional migration to migrate the DMO velocity to the proper spatial location thereby to provide a better estimate of the true sub-surface velocity and thus to migrate the seismic data with greater accuracy.

SUMMARY OF THE INVENTION

This invention provides a method for migrating velocity spectra, derived from a plurality of Common Mid Point gathers, from the initial unmigrated reflector position of the spectra, to their true spatial positions. Normal moveout and dip-moveout corrections are applied to the reflection data. Thereafter, inverse normal moveout is applied to the reflection data. The dip-corrected seismic data are used to generated a velocity spectrum for each CMP gather. The so-generated velocity spectra are then mapped over a spatial grid to create a data volume that has the dimensions of velocity, CMP location and two-way reflection travel time. At least one common constant velocity slice is extracted from the data volume. The velocity slice is migrated to its correct spatial position by use of a selected migration theorem. The migrated velocity slice is then replaced back into the data volume.

In another aspect of this invention, the steps of extracting, migrating and replacing are repeated for a plurality of different common constant velocity slices.

BRIEF DESCRIPTION OF THE DRAWINGS

These and other objects and benefits of the present invention will be better understood by reference to the appended detailed description of the preferred embodiment taken in conjunction with the accompanying drawings, wherein the like reference numerals have been applied to like elements of the Figures.

DETAILED DESCRIPTION OF THE PREFERRED EMBODIMENT

Migration velocity spectra are routinely generated by any one of a number of well known methods in the process of reducing seismic reflection field data to an interpretable quasi-geologic section. A velocity spectrum is a graph of velocity along the x-axis as a function of two-way reflection travel time plotted along the z-axis. The individual velocity spectra for a plurality of CMP gathers are positioned orthogonally to a line representing the locations of each of the respective corresponding CMP gathers. The line representing the CMP locations forms the y-axis of a data volume having coordinates of velocity along the x-axis, CMP location along the y-axis and two-way travel time along the z-axis.

The migration-velocity field can be studied by taking slices along any one of the three orthogonal planes of the data volume: Vertical slices, parallel to the x-axis of the data volume, show the migration velocity at selected CMP locations. Vertical planes sliced parallel to the y-axis are sections that display focused energy for different common constant velocity values. Horizontal planes are time slices that exhibit the lateral continuity and resolution of the migration velocity vs. CMP location at selected vertical travel-time instants.

The examples to follow are exemplary for a better understanding of this invention but they are in no way to be taken as limitations to the appended claims.

Figure 1:
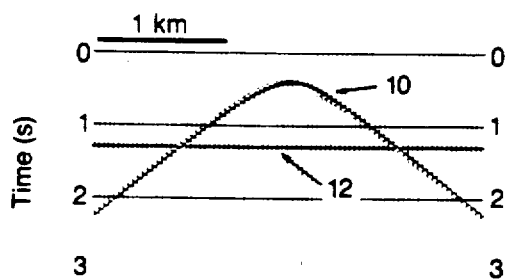
FIG. 1 shows a zero-offset synthetic model consisting of a point diffractor and a flat event for a plurality of CMP gathers.

The velocity spectra can be migrated as will now be shown with the aid of the synthetic example of FIG. 1. FIG. 1 shows the zero-offset response 10 to a point diffractor (not shown) and a flat event 12. The velocity for the model is constant at 1750 m/s (meters per second) down to the diffractor and it then increases to 2000 m/s at the flat event. Twenty-one-trace CMP gathers, every 12.5 meters, were generated for the model. Every fourth trace is plotted on the model which represents a 3000-meter-long profile. NMO, DMO and inverse NMO were applied. Velocity analyses or spectra were computed at each of the CMP locations shown in the Figure.

Figure 2:
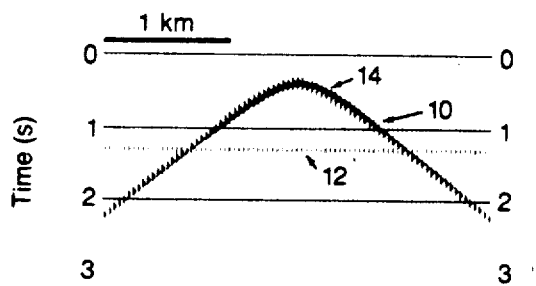
FIG. 2 shows a common constant-velocity slice through the unnormalized semblance velocity spectra of the model at 1750 m/s.

FIG. 2 is a constant-velocity slice obtained by extracting from each CMP velocity spectrum, the semblance values for a velocity of 1750 m/s. If DMO had not been applied, the velocity required to stack nonzero offset data would be 1750 m/s at the apex 14 of the hyperbola 10, but would increase with increasing dip along its limbs. Because DMO was applied, the entire hyperbola 10 exhibits a semblance peak at 1750 m/s and thus the same hyperbolic shape appears in the velocity slice as appeared in the seismic reflection data. After the velocity data have been repositioned, the velocity spectrum is replaced back into the original data volume.

Figure 3:
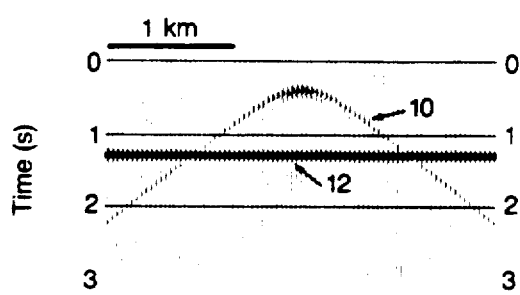
FIG. 3 shows a common constant-velocity slice through the unnormalized semblance velocity spectra at 2000 m/s.

FIG. 3 shows a common constant velocity slice taken at the velocity of 2000 m/s. The flat event 12 is now clearly defined but the diffraction hyperbola 10 is weak. FIGS. 2 and 3 demonstrate that the semblance values for the correct DMO stacking velocity for a selected reflection shows the same structure as the unmigrated section.

Because the data are unmigrated, at the intersections of the hyperbola 10 and the flat event 12, the calculated velocity is multi-valued, that is, the velocity spectrum at the level of the event intersections includes both shallow and deep velocities. The spectrum is therefore dispersed and is not well resolved.

Figure 4:
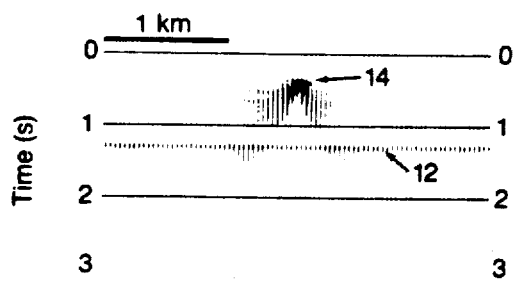
FIG. 4 shows a common constant-velocity (1750 m/s) f-k migration of the semblance section of FIG. 2.
Figure 5:
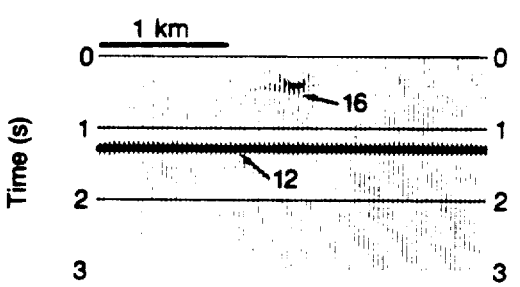
FIG. 5 shows a common constant velocity (2000 m/s) f-k migration of the semblance section of FIG. 3.

FIG. 4 shows the result of applying f-k migration with a constant velocity of 1750 m/s to the data of FIG. 2. Just as migration of the seismic data with a velocity of 1750 m/s would collapse the hyperbola to its apex, migration of the velocity spectra has collapsed the velocity hyperbola 10 to its apex 14 which is now in the proper spatial position. In FIG. 5, the data from FIG. 3 have been migrated with a constant velocity of 2000 m/s. The flat event 12 has not changed but the remanent 16 of the hyperbola has been over-corrected and dispersed.

Figure 6:
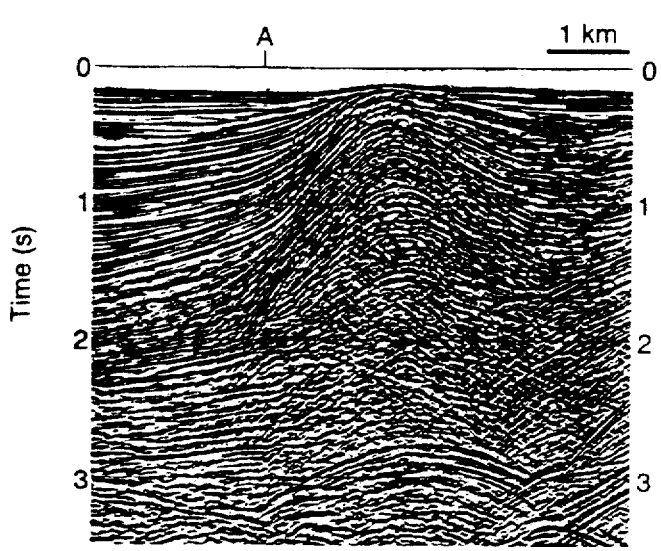
FIG. 6 shows a field example of an unmigrated CMP stack after application of DMO.
Figure 8:
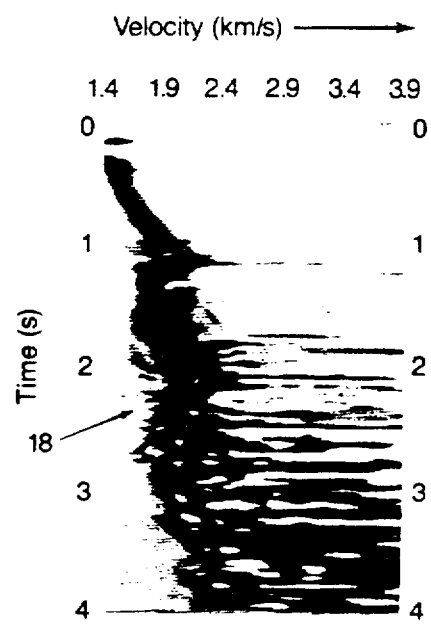
FIG. 8 shows an unmigrated velocity spectrum from location A of FIG. 6.

FIG. 6 is a field example of a CMP stack of unmigrated data to which DMO was applied prior to stacking. Because the data were not migrated, steep reflections from shallow reflectors intersect the more gently dipping reflections beneath station A at a two-way reflection time of between about 1.7 to 2.25 seconds. Those post-DMO, steeply dipping events are characterized by a lower velocity because they originate from shallower bedding planes. The corresponding velocity spectrum 18 of FIG. 8, which was generated at location A shows poor resolution because of the conflicting dips.

Figure 7:
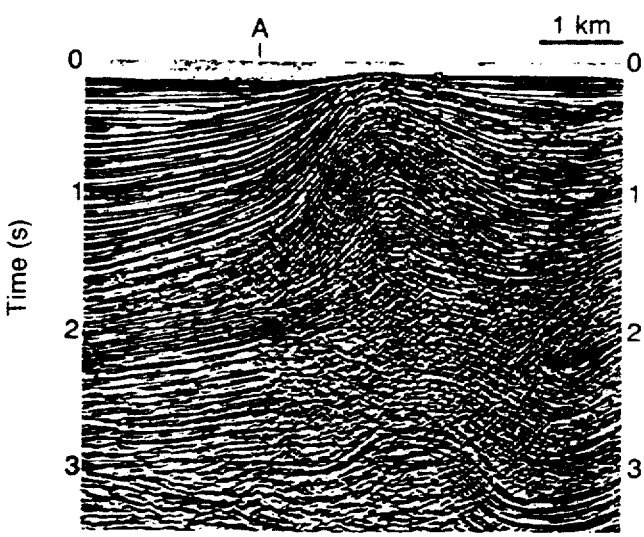
FIG. 7 shows the field example of FIG. 6 after velocity and dip migration.
Figure 9:
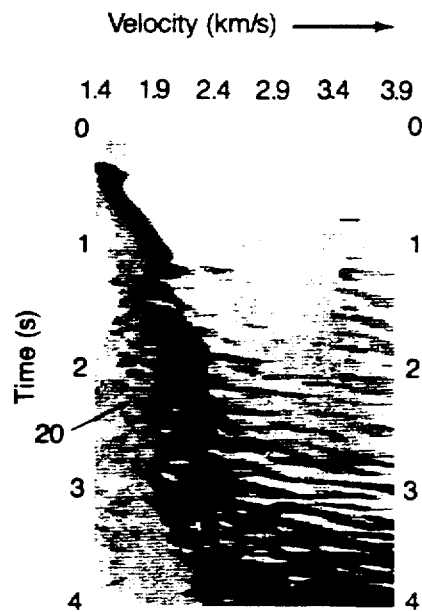
FIG. 9 shows the migrated velocity spectrum from the same location.

FIG. 7 illustrates the data of FIG. 6 after dip migration using migration velocities that themselves have been migrated to their correct spatial positions. Most of the dip-conflicts have been resolved. The velocity spectrum 20 shown in FIG. 9 is the velocity spectrum corresponding to the display of FIG. 7 at location A, after migration of the velocity data. Observe that the resolution of the velocity spectrum has been substantially improved in the reflection-time region between about 1.2 and 2.0 seconds and indeed, down to 3.0 seconds.

Velocity information is inherently much lower in temporal frequency than are the reflection data. Velocity data can therefore be sampled much more coarsely both spatially and temporally than the seismic reflection data. Because sparse sampling is permissible, any number of different velocity slices can be selected from a given data volume for processing and migration. The number of velocity slices that may be selected depends upon the complexity of the geology and the number of discrete velocity sequences characteristic of the region under investigation. Migration of velocity data offers an economical computerized approach for refining the estimation of the correct migration velocity.

In operation, it is preferable to employ f-k (frequency-wavenumber) migration for the velocity spectra as being somewhat more economical. However, any other well-known method may be used such as Finite Difference migration or Kirchhoff Wave Field migration. It is to be understood that the principles taught by this disclosure may be applied not only to marine and terrestrial surface profiling but also to vertical seismic profiling from boreholes.

Other techniques will occur to those skilled in the art but which will fall within the scope and spirit of this disclosure which is limited only by the appended claims.

WHAT IS CLAIMED IS:

1. A method for migrating velocity spectra, derived from a plurality of common midpoint gathers located over a spatial grid, to their true spatial position, comprising the steps of:

applying normal moveout, dip moveout and inverse normal moveout to each of the common midpoint gathers;

generating a velocity spectrum for each said common midpoint gather;

mapping each said velocity spectrum over said spatial grid to create a data volume having the dimensions of corresponding velocity, common midpoint location and two-way reflection travel time;

extracting at least one common constant velocity slice from said data volume;

migrating said velocity slice to its correct spatial location; and restoring the migrated velocity slice to said data volume.

2. The method as defined by claim 1, comprising the further steps of:

repeating the steps of extracting, migrating and restoring for a selected number of common constant velocity slices.

* * * * *